US008457659B2

(12) United States Patent
Pudney

(10) Patent No.: US 8,457,659 B2
(45) Date of Patent: Jun. 4, 2013

(54) TELECOMMUNICATIONS NETWORKS

(75) Inventor: Christopher David Pudney, Newbury (GB)

(73) Assignee: Vodafone Group Services Limited, Newbury, Berkshire (GB)

( * ) Notice: Subject to any disclaimer, the term of this patent is extended or adjusted under 35 U.S.C. 154(b) by 1215 days.

(21) Appl. No.: 12/087,535

(22) PCT Filed: Jan. 10, 2007

(86) PCT No.: PCT/GB2007/000058
§ 371 (c)(1),
(2), (4) Date: Oct. 9, 2008

(87) PCT Pub. No.: WO2007/080397
PCT Pub. Date: Jul. 19, 2007

(65) Prior Publication Data
US 2009/0221304 A1 Sep. 3, 2009

(30) Foreign Application Priority Data

Jan. 10, 2006 (GB) .................................. 0600401.4

(51) Int. Cl.
*H04W 68/00* (2009.01)
(52) U.S. Cl.
USPC ..................... 455/458; 455/422.1; 455/452.1; 370/331; 370/338
(58) Field of Classification Search
USPC ................... 455/432.1, 433, 434, 435.1, 436, 455/515, 452.1, 458, 422.1; 370/335, 337, 370/347, 332, 342, 331, 338, 311, 380, 348
See application file for complete search history.

(56) References Cited

U.S. PATENT DOCUMENTS 6,272,339 B1 * 8/2001 Wiedeman ................. 455/426.1
6,832,074 B2 * 12/2004 Borras-Chia et al. ...... 455/67.13
(Continued)

FOREIGN PATENT DOCUMENTS

EP 1124399 8/2001
EP 1511342 3/2005
(Continued)

OTHER PUBLICATIONS

3GPP TS 23.236 V7.0.0 (Dec. 2006), 3rd Generation Partnership Project; Technical Specification Group services and System Aspects; Intra-domain connection of Radio Access Network (RAN) nodes to multiple Core Network (CN) nodes (Release 7), Dec. 2006, 37 pp.

*Primary Examiner* — Mahendra Patel
(74) *Attorney, Agent, or Firm* — Muirhead and Saturnelli, LLC

(57) ABSTRACT

A telecommunication system includes a first radio access technology having a first radio access network and a first network core operable to page a mobile terminal via at least one element of the first radio access technology. The telecommunications system also includes a second radio access technology having a second radio access network and a second network core operable to page said mobile terminal via at least one element of the second radio access technology. Each of these elements may receive the page from its radio access technology, determine whether the mobile terminal is registered with that radio access technology and notify its core network if the mobile terminal is not registered. The core network may cause the mobile terminal to be paged in the other radio access technology. Different timer periods for idle timers at mobile terminal and eNodeB may avoid possible loss of mobile terminating data.

18 Claims, 5 Drawing Sheets

U.S. PATENT DOCUMENTS

| | | | |
|---|---|---|---|
| 7,130,284 B2 * | 10/2006 | Lee et al. | 370/331 |
| 7,142,520 B1 * | 11/2006 | Haverinen et al. | 370/311 |
| 7,957,352 B2 * | 6/2011 | Vanghi et al. | 370/335 |
| 2001/0016493 A1 * | 8/2001 | Kim et al. | 455/436 |
| 2004/0203469 A1 * | 10/2004 | Patel et al. | 455/67.14 |
| 2006/0052137 A1 * | 3/2006 | Randall et al. | 455/560 |

FOREIGN PATENT DOCUMENTS

| | | |
|---|---|---|
| EP | 1519515 | 3/2005 |
| WO | WO 01/97549 A1 | 12/2001 |
| WO | WO 2006/095213 A1 | 9/2006 |

* cited by examiner

TELECOMMUNICATIONS NETWORKS

FIELD OF THE INVENTION

The present invention relates to a telecommunications network and system, and a method of operating a telecommunications network and system.

BACKGROUND TO THE INVENTION

Currently 2G (GSM), 2.5G (GPRS) and 3G (UMTS/UTRA) mobile or cellular telecommunications networks co-exist. Mobile terminals provide continuous to service while moving from a 2G (which term hereinafter includes 2.5G) coverage area to a 3G coverage area of a network.

A development of 3G mobile telecommunications is "evolved" UTRA or E-UTRA, also referred to as SAE (System Architecture Evolution)/LTE (Long Term Evolution). It is desirable for mobile terminals to provide continuous service also when moving from an LTE coverage area to a 3G or 2G coverage area.

SUMMARY OF THE INVENTION

According to a first aspect of the present invention, there is provided a telecommunications network including a radio access network and a network core operable to page a mobile terminal, wherein at least one element of the network is operable to receive mobile terminating data from the network and to determine whether that mobile terminating data can be delivered to the mobile terminal and characterised in that said at least one element is operable to instruct the network core to page the mobile terminal if the mobile terminating data cannot be delivered to the mobile terminal.

In various embodiments a telecommunications network includes a radio access network and a network core operable to page a mobile terminal via at least one element of the network, wherein said at least one element is operable to receive mobile terminating data from the network and to determine whether that mobile terminating data can be delivered directly to the mobile terminal or whether that element needs to request the network core to page the mobile terminal (the page is used to locate the cell in which the mobile terminal is camped so that subsequently the mobile terminating data can be delivered).

The said one element may be part of the radio access network. The network may be a GSM/UMTS network or an LTE network. The said one element may be an SGSN, or RNC or base transceiver station or eNodeB.

According to a second aspect of the present invention, there is provided a telecommunications network including a radio access network and a network core, wherein at least one element of the network is operable to receive mobile terminating data destined for a mobile terminal from the network and to determine whether the mobile terminal is in an active state (for example not in an idle or inactive state) and to notify the core network if the mobile terminal is in an idle or inactive state.

According to a third aspect of the present invention, there is provided a system including the telecommunications network provided above, which comprises a first radio access technology, and which system further includes a second radio access technology having a second radio access network and a second network core.

The first radio access technology may be GSM/UMTS and the second radio access technology may be LTE, or vice versa.

When respective first and second radio access technologies are provided, and the mobile terminal may register with one or the other or both of these radio access technologies, it is advantageous for the said element to be able to determine whether the mobile terminating data can be delivered directly to the mobile terminal or whether to notify the network core if the mobile terminating data cannot be delivered directly to the mobile terminal. For example, if the element that receives the mobile terminating data is an element of the first radio access technology, and the mobile terminal is camped on a cell of the second radio access technology, the element can notify the core network that the mobile terminating data cannot be delivered, thereby facilitating the paging of the mobile terminal using the second radio access technology, and the first radio access technology.

In some of the embodiments the first radio access network is divided into a plurality of first areas and the second radio access network is divided into a plurality of second areas, the first areas being different from the second areas.

In these embodiments the first areas and the second areas are paging areas, such as routing areas or the equivalent thereof (for example LTE "tracking areas"). The areas are collections of cells, each cell being served by a particular base station/access point. Such areas are provided because, as is known to those skilled in the art, and as is discussed briefly below, this provides efficient paging of mobile terminals.

In these embodiments the first areas are different from the second areas. The mobile terminal is registered in a different one of the first and second areas. The first areas and the second areas may advantageously be different in order to allow each of the radio access technologies to be optimised. For example, the radio characteristics of the different radio access technologies may be different, meaning that the size of a cell of one of the radio access technologies will be different to the optimum size of the cell of the other radio access technology. For radio access technology where the cells are smaller, the routing areas may be smaller. However, advantageously, selected first areas are associated with selected second areas. The associated first and second areas may be deemed to be equivalent areas in the respective radio access technologies. The equivalent areas may cover the same geographical area.

Each cell is served by a respective base station. The base stations may each comprise a base transceiver station, node B or eNodeB. The cells are smaller than the "areas".

The mobile terminal has idle or inactive states in each of the radio access technologies. In some embodiments the first radio access technology is UMTS. In UMTS the inactive states are RRC-IDLE and URA-PCH. Advantageously, no signaling to the network is performed from the mobile terminal when it moves from an inactive state of one of the radio access technologies to an inactive state of the other radio access technology. Such a movement may occur when the mobile terminal moves from being camped on a base station/access point of one radio access technology to being camped on a base station/access point of another radio access technology (that is within the equivalent area) whilst that mobile terminal is in the idle or inactive state.

In the active state the cell occupied by the mobile terminal in one of the radio access technologies is known. In the idle or inactive state the cell occupied by the mobile terminal is not known but the last "area" known to be occupied by the mobile terminal is recorded. In the embodiment, in the idle or inactive state no signalling from the mobile terminal to the core network is performed when the mobile terminal moves from one of the radio access technologies to the other of the radio access technologies while remaining registered with both the relevant SGSN and MME.

According to a fourth aspect of the present invention, there is provided a telecommunications network including a radio access network comprising a plurality of nodes, a core network, and a plurality of telecommunications terminals for communicating with the core network via an associated one of the nodes, the telecommunications terminals each having a timer which expires after a first duration after a triggering event, and the nodes each having a timer which expires after a second duration after a triggering event, wherein the expiry of the telecommunications terminal timer causes the telecommunications terminal to enter an idle communication state and the expiry of the node timer causes the node to notify the core network that the terminal has entered an idle communication state, characterised in that the second duration is shorter than the first duration and by the arrangement being such that, in response to a triggering event of the telecommunications terminal timer and the node timer, the telecommunications terminal enters the idle state after the associated node has notified the core network that the terminal has entered the idle communication state.

Such an arrangement is advantageous because the core network is notified by the node that the mobile terminal has entered the idle state before the mobile terminal itself determines that it has entered the idle state. Advantageously, in the embodiments, when the core network receives the notification from the node that the mobile terminal is in the idle mode, the network stops any attempts to send mobile terminating data directly to the mobile terminal and instead pages the mobile terminal. It is preferable to stop these attempts to send mobile terminating data to the mobile terminal before the mobile terminal itself enters the idle state. If the mobile terminal entered the idle state before the mobile terminating data ceased transmission from the core network, this mobile terminating data may be lost as, in the idle state, the mobile terminal can move into a different cell without the network knowing about the cell change.

The triggering event of the telecommunications terminal timer may be a pause in the transmission of data to or from the telecommunications terminal. The triggering event of the node may be a pause in transmission of the data to or from the node. The triggering events of the mobile terminal and the node may be the same.

According to a fifth aspect of the present invention, there is provided a telecommunications system including a first radio access technology having a first radio access network and a first network core operable to send data to a mobile terminal via at least one element of the first radio access technology, and a second radio access technology having a second radio access network and a second network core operable to send data to said mobile terminal via at least one element of the second radio access technology, characterised in that at least one of said networks is operable to reconfigure the data from a form suitable for sending by the first radio access technology into a form suitable for sending by the second radio access technology.

The reconfiguration may include encryption, decryption, compression or decompression of the data.

The first radio access technology may be 2G, 2.5G or 3G, and the second radio access technology may be LTE, or vice versa.

In LTE mobile terminating data may be processed by performing header compression and encryption in the core network, whereas in the 3G UMTS technology, such header compression and encryption is performed in the Radio Access Network. In the embodiments, when the mobile terminal moves from one radio access technology to another radio access technology, the facility of the core network to reconfigure the data allows data originally configured for transmission over one of the radio access technologies to be reconfigured for transmission by the other radio access technology.

The invention also provides methods as defined in the independent claims.

BRIEF DESCRIPTION OF THE DRAWINGS

For a better understanding of the present invention embodiments will now be described by way of example, with reference to the accompanying drawings, in which:

In the drawings like elements are generally designated with the same reference sign.

In FIGS. 2 to 5 the dashed lines denote signalling and the solid lines denote user plane data (sometimes with associated signalling information).

DETAILED DESCRIPTION OF EMBODIMENT OF THE INVENTION

Figure 1:
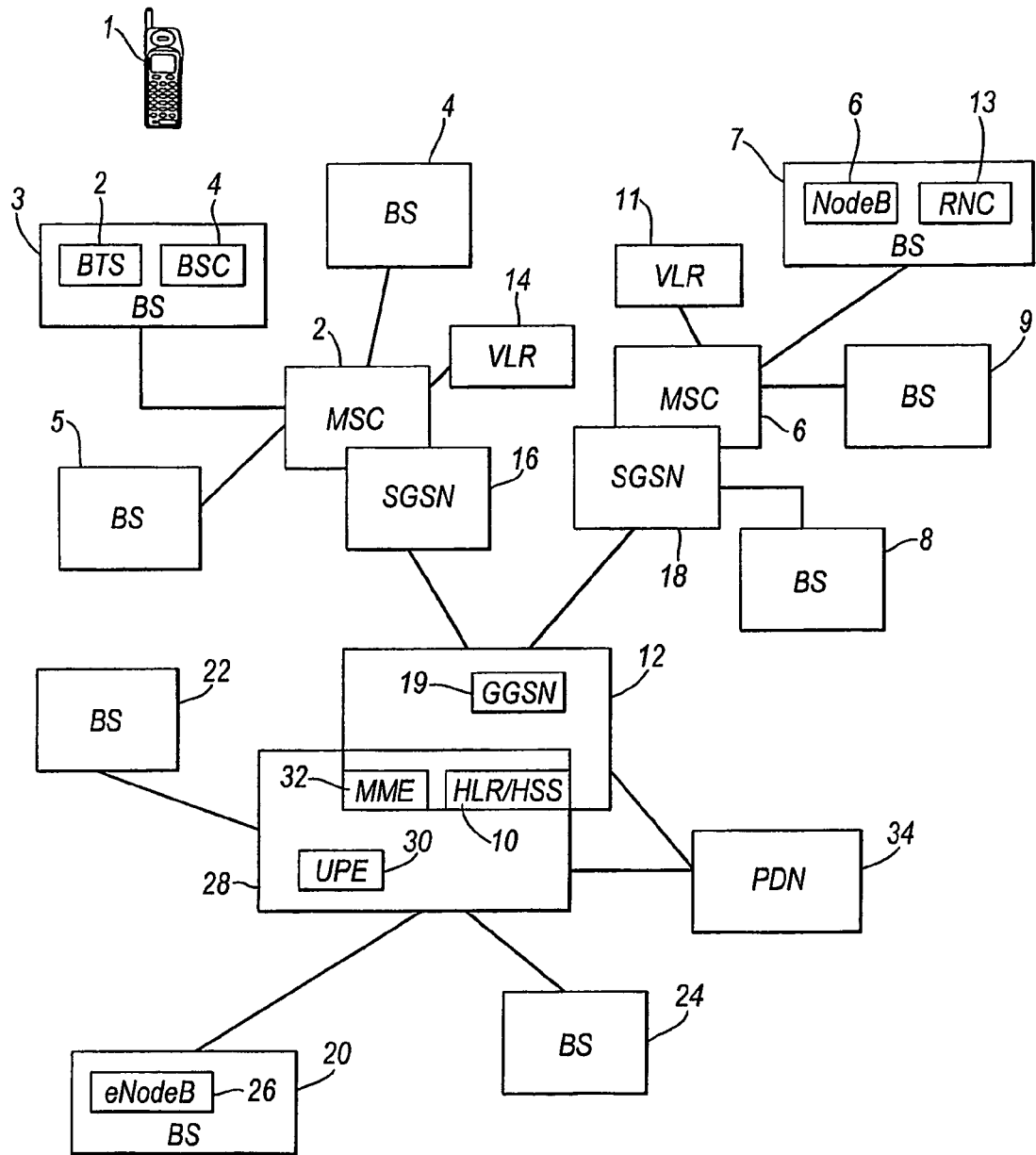
FIG. 1 is a diagrammatic drawing of key elements of a mobile telecommunications network for use in explaining the operation of such a network.

Key elements of a mobile telecommunications network, and its operation, will now briefly be described with reference to FIG. 1.

Each base station (BS) corresponds to a respective cell of its cellular or mobile telecommunications network and receives calls/data from and transmits calls/data to a mobile terminal in that cell by wireless radio communication in one or both of the circuit switched or packet switched domains. Such a subscriber's mobile terminal (or User Equipment-UE) is shown at 1. The mobile terminal may be a handheld mobile telephone, a personal digital assistance (PDA), a laptop computer equipped with a datacard, or a laptop computer with an embedded chipset containing the UE's functionality.

In a GSM (2G) mobile telecommunications network, each base station subsystem 3 comprises a base transceiver station (BTS) 2 and a base station controller (BSC) 4. A BSC may control more than one BTS. The BTSs and BSCs comprise the radio access network.

In a UMTS (3G) mobile telecommunications network, a radio network controller (RNC) 13 may control more than one node B 6. The node B's and RNC's comprise the radio access network.

Conventionally, the base stations are arranged in groups and each group of base stations is controlled by one mobile switching centre (MSC), such as MSC 2 for base stations 3,4 and 5. As shown in FIG. 1, the network has another MSC 6, which is controlling a further three base stations 7,8 and 9. In practice, the network will incorporate many more MSCs and base stations than shown in FIG. 1.

Each subscriber to the network is provided with a smart card or SIM which, when associated with the user's mobile terminal identifies the subscriber to the network. The SIM card is pre-programmed with a unique identification number, the "International Mobile Subscriber Identity" (IMSI) which is not visible on the card and is not known to the subscriber. The subscriber is issued with a publicly known number, that is, the subscriber's telephone number, by means of which calls to the subscriber are initiated by callers. This number is the MSISDN.

The network includes a home location register (HLR)/home subscriber server (HSS) 10 which, for each subscriber to the network, stores the IMSI and the corresponding MSISDN together with other subscriber data, such as the current or last known location of the subscriber's mobile terminal. The HSS is the master database for the network, and while logically it is viewed as one entity, in practice it will be made up of several physical databases. The HSS holds variables and identities for the support, establishment and maintenance of calls and sessions made by subscribers. As well as the basic HLR/authentication functions, the HSS may be enhanced through the use of additional databases and reference points. This enables the network to offer the subscriber advanced services and features by interfacing with service application servers based on CAMEL, OSA (Open Service Access) and SIP.

When the subscriber wishes to activate their mobile terminal in a network (so that it may make or receive calls subsequently), the subscriber places their SIM card in a card reader associated with the mobile terminal (terminal 1 in this example). The mobile terminal 1 then transmits the IMSI (read from the card) to the base station 3 associated with the particular cell in which the terminal 1 is located. In a traditional network, the base station 3 then transmits this IMSI to the MSC 2 with which the BS 3 is registered. In a network using the functionality described in 3GPP TS 23.236, the base station follows prescribed rules to select which MSC to use, and then transmits this IMSI to the selected MSC.

MSC 2 now accesses the appropriate location in the HLR/HSS 10 present in the network core (CN) 12 and extracts the corresponding subscriber MSISDN and other subscriber data from the appropriate storage location, and stores it temporarily in a location in a visitor location register (VLR) 14. In this way, therefore the particular subscriber is effectively registered with a particular MSC (MSC 2), and the subscriber's information is temporarily stored in the VLR (VLR 14) associated with that MSC. The information stored on the VLR 14 includes a Temporary Mobile Subscriber Identification (TMSI) number for identification purposes for the terminal within the MSC 2. The TMSI number is an identification number that is typically 32 bits in length. In conventional systems, therefore, the TMSI number is not allocated to more than one user of a given system served by that MSC at one time. Consequently, the TMSI number is usually invalidated when the mobile station crosses into a new location served by a different MSC.

When the HLR 10 is interrogated by the MSC 2 in the manner described above, the HLR 10 additionally performs an authentication procedure for the mobile terminal 1. The HLR 10 transmits authentication data to the MSC 2 in "challenge" and "response" forms. Using this data, MSC 2 passes a "challenge" to the mobile terminal 1 through base station 3. Upon receipt of this data, the mobile terminal 1 passes this data to its SIM and produces a "response". This response is generated using an encryption algorithm on the SIM and a unique Ki on the SIM. The response is transmitted back to the MSC 2 which checks it against its own information for the subscriber which checks it against information that it has obtained for that subscriber from the HLR 10 in order to complete the authentication process. If the response from the mobile terminal 1 is as expected, the mobile terminal 1 is deemed authenticated. At this point the MSC 2 requests subscription data from the HLR 10. The HLR 10 then passes the subscription data to the VLR 14.

The authentication process will be repeated at regular intervals while the mobile terminal 1 remains activated and can also be repeated each time the mobile terminal makes or receives a call, if required.

Each of the MSCs of the network (MSC 2 and MSC 6) has a respective VLR (14 and 11) associated with it and operates in the same way as already described when a subscriber activates a mobile terminal in one of the cells corresponding to one of the base stations controlled by that MSC.

When the subscriber using mobile terminal 1 wishes to make a call, having already inserted the SIM card into the reader associated with this mobile terminal and the SIM has been authenticated in the manner described, a call may be made by entering the telephone number of the called party in the usual way. This information is received by the base station 3 and passed on to the MSC 2. The MSC 2 routes the calls towards the called party via the MSC 2. By means of the information held in the VLR 14, MSC 2 can associate the call with a particular subscriber and thus record information for charging purposes.

The MSCs 2 and 6 support communications in the circuit switched domain—typically voice calls. Corresponding SGSNs 16 and 18 are provided to support communications in the packet switched domain—such as GPRS data transmissions. The SGSNs 16 and 18 function in an analogous way to the MSCs 2 and 6. The SGSNs 16, 18 are equipped with an equivalent to the VLR for the packet switched domain. GGSN 19 provides IP connectivity for the CN 12.

From the description above, it will be understood that the coverage area of a mobile telecommunications network is divided into a plurality of cells, each of which is served by a respective base station. In order to allow a mobile terminal to maintain a call when the mobile terminal moves outside the coverage area of a cell, the call must be switched to an alternative cell automatically. The call must be routed to the new cell before handover can be effected whilst maintaining the connection with the old cell until the new connection is known to have succeeded. Handover is a time critical process requiring action to be taken before the radio link with the original cell degrades to such an extent that the call is lost. Handover requires synchronisation of events between the mobile terminal and the network.

When a calling party (whether a subscriber within the mobile telecommunications network or outside it) attempts to call a mobile terminal within the network, that mobile terminal must be paged. Paging is a process of broadcasting a message which alerts a specific mobile terminal to take some action—in this example, to notify the terminal that there is an incoming call to be received. If the network knows in which cell the mobile terminal is located, it is only necessary to page in that cell. However, if the mobile terminal is moving within the network, the precise cell in which the mobile terminal is located may not be known. It will therefore be necessary to perform paging in a number of cells. The greater the number of cells in which paging must occur, the more use of valuable signalling capacity within the network.

However, if the HLR is to always have an up-to-date record of the cell in which each mobile terminal is located so that the current cell which is occupied by a terminal is always known, this will require a large amount of location updating signalling between the mobile terminal and the HLR in order that the HLR has up-to-date records of the cells occupied by each mobile terminal. This is also wasteful of valuable signalling capacity.

As indicated above, the HLR is updated each time a mobile terminal moves from the coverage area of one MSC to another MSC and from one SGSN to another SGSN. However, typically the area covered by a single MSC and SGSN is large, and to page all the cells covered by a single MSC and SGSN would require a significant amount of paging signalling.

The problems of excessive use of signalling capacity by paging a multiplicity of cells or performing a multiplicity of frequent location updates is solved in a known manner in 2G and 3G networks by dividing the coverage area of the mobile telecommunications network into a plurality of location areas (LAs) and into a plurality of routing areas (RAs).

A location area relates to a particular geographical area for communications in the circuit-switched domain. Typically, although not necessarily, a location area is larger than the area of a single cell but is smaller than the area covered by one MSC. Each cell within the network broadcasts data indicative of the identity of its location area (LAI). The mobile terminal uses this data to determine when it has moved into a new location area. The terminal stores its last known location area on its SIM. This information stored on the SIM is compared with the location area information broadcast by the local cell. The identities of the two location areas are compared. If they are different, the mobile terminal determines that it has entered a new location area. The mobile terminal then gains access to a radio channel and requests a location area update (LAU). The request includes the now out-of-date LAI and the terminal's current TMSI. If the MSC/VLR is the same for the new and old location areas, the network can immediately authenticate the mobile terminal and note the change of location area. However, if the mobile terminal is moved to a different MSC/VLR, the MSC/VLR addresses a message to the HSS/HLR. The HSS/HLR notes the new location and downloads security parameters to allow the network to authenticate the mobile. It also passes on subscription details of the user to the new VLR and informs the old VLR to delete its records. The new MSC/VLR allocates a new TMSI to the mobile.

A routing area relates to a particular geographical area for communications in the packet-switched domain. Typically, although not necessarily, a routing area is larger than the area of a single cell but is smaller than the area covered by one SGSN. A routing area is typically, although not necessarily, smaller than a location area. There may be many routing areas within one location area. Each cell within the network broadcasts data indicative of its routing area (RAI) in addition to the data mentioned above indicative of the identity of its location area. The mobile terminal uses this received data to determine when it has moved to a new routing area. The terminal stores the last known routing area on its SIM. The information stored on the SIM is compared with the routing area information broadcast by the local cell. The identities of the two routing areas are compared. If they are different, the mobile terminal determines that it has entered a new routing area. The mobile terminal then gains access to a radio channel and requests a routing area update (RAU). The routing area is updated in the same manner as the location area, as discussed above.

Communications between the mobile terminal 1 and the network core 12 can be considered to be split into a control plane and a user plane. The control plane performs the required signaling, and includes the relevant application protocol and the signaling bearer for transporting the application protocol messages. Among other things, the application protocol is used for setting up the radio access bearer in the radio network layer. The user plane transmits data traffic and includes data streams and data bearers for the data streams. The data streams are characterized by one or more frame protocols specified for that interface. Generally speaking, the user plane carries data for use by a receiving terminal—such as data that allows a voice or picture to be reproduced—and the control plane controls how the data is transmitted.

A mobile terminal has an active mode and an idle/inactive mode.

For 2G and 3G, a mobile terminal is in active communication when it has a CS (Circuit Switched) connection established. For SAE/LTE, CS connections are not used.

In 2.5G, GPRS PS (Packet Switched), active communication can be defined as the GPRS Ready state. In 3G UMTS PS, active communication can be defined as the all of RRC connected mode states excluding URA_PCH. In LTE, active communication can be defined as the Active state.

In 3G UMTS PS, URA_PCH can be defined as an inactive state. In GPRS, the Standby state can be regarded as an inactive state.

Either one or both of the CS and PS active communications may occur in the mobile terminal.

Whilst in 2G or 3G idle mode, a mobile terminal has no CS connection. In the idle and inactive mode the mobile terminal implements cell selection and reselection procedures. The mobile terminal is registered on the network, and listens for paging messages. The mobile terminal performs location area updates when necessary. The idle state in GRPS indicates that the mobile has not yet registered onto the network or is switched off.

For a 3G mobile terminal, in the active mode the terminal is in the RRC (Radio Resource Control) connected mode. The RRC connected mode includes the following three active states and one inactive (URA_PCH) state:

CELL_DCH state is characterized by:
    A dedicated physical channel is allocated to the UE in uplink and downlink.
    The UE is known on cell level according to its current active set
    Dedicated transport channels, downlink and uplink (TDD) shared transport channels and a combination of these transport channels can be used by the UE.

CELL_FACH State is Characterized by:
    No dedicated physical channel is allocated to the UE.
    The UE continuously monitors a FACH (forward access channel) in the downlink.
    The UE is assigned a default common or shared transport channel in the uplink (e.g. RACH) that it can use anytime according to the access procedure for that transport channel.
    The position of the UE is known by UTRAN on cell level according to the cell where the UE last made a cell update.
    In TDD mode, one or several USCH or DSCH transport channels may have been established.

CELL_PCH State is Characterized by:
    No dedicated physical channel is allocated to the UE. The UE selects a PCH (paging channel) with the algorithm, and uses DRX for monitoring the selected PCH via an associated PCH.
    No uplink activity is possible.
    The position of the UE is known by UTRAN on cell level according to the cell where the UE last made a cell update in CELL_FACH state.

URA_PCH State is Characterized by:
No dedicated channel is allocated to the UE. The UE selects a PCH, and uses DRX for monitoring the selected PCH via an associated PCH.
No uplink activity is possible.
The location of the UE is known on UTRAN routing area level according to the URA assigned to the UE during the last URA update in CELL-FACH state.

The discussions on the 3GPP System Architecture Evolution have highlighted a number of areas where further work is required to successfully implement LTE. Elements of an LTE network are shown in FIG. 1. The base stations 20,22 and 24 comprise an eNodeB (evolved Node B) 26. The RRC signalling with the mobile terminal 1 terminates at the eNode B26, the eNode B comprising the RAN of the LTE network. The eNode B 26 performs the functions of both the Node B and a large part of the RNC of the 3G/UMTS network. The network core 28 of the LTE network includes User Plane Entity (UPE) 30, the HLR/HSS 10 (a common HLR/HSS shared with the network core 12 of the GSM/UMTS network) and also Mobility Management Entity (MME) 32 (also shared with the network core 12 of the GSM/UMTS network). A plurality of UPEs are usually provided, although only one is shown.

Although shown separately in FIG. 1 (and FIG. 3), the UPE 30 and GGSN 19 may be combined to form a single element. For the purposes of this document, UPE 30 and GGSN 19 are considered to be a common element with one interface to Packet Data Network (PDN) 34 (for example, the Internet).

Both the GSM/UMTS and LTE networks communicate with PDN 34.

As discussed above, GSM and UMTS mobile telecommunications networks are divided into location areas/routing areas. In the embodiments to be described the LTE network has the equivalent of location/routing areas (herein "tracking areas"). Tracking area updates are performed in a similar manner to RAUs and URA updates.

The size and position of the tracking areas may be different from the size and area of the LAs and RAs. This requires the efficient handling the relationship between the tracking areas of an LTE network and locations routing areas of other networks, such as existing 2G and 3G networks.

Existing potential solutions will now be briefly described.
Existing Solution—Common Tracking/Routing Areas Placing the GSM and UMTS cells into the same LA and RA is the basic part of to the UMTS/GSM solution. However this does mean that both the MSC and SGSN are shared between 2G and 3G. This is awkward for the SGSN as it has to support both the Gb and Iu-ps interfaces and their different RAN/CN functional splits.

From a standardisation point of view, it would be relatively easy to extend this concept to cover LTE, UTRA and GSM. However, from an implementation point of view, it is unlikely that it will be ideal to develop core network nodes that support all of the Gb, the Iu-ps and the LTE RAN-CN interface.

In addition, the "signalling free movement between 2G and 3G" only applies in the "idle" state (GPRS-Standby to Packet Mobility Management (PMM) idle) and means that the UTRAN routing Area (URA) Paging Channel (PCH) state does not get utilised to its full benefit.
Existing Solution—Common RNC With "basic GSM" and "EDGE", and with GSM in different frequency bands (900, 1800, etc), a common BSC can be used with all the cells in the same LA/RA.

A similar technique could be used for connecting LTE and UTRA cells to the same RNC. This does constrain the LTE architecture but might permit the URA-PCH/long live Iu-ps connections to be maintained.

Alternative Solution: Routing Areas and Tracking Areas
The embodiments of the invention use this solution.

One of the main issues is how "inactive mode" mobility is to work between the new LTE system and the existing UTRAN/GERAN systems. One of the main requirements for location management of a UE (User Equipment) between the LTE system and 2G/3G is to provide a signalling-less movement between LTE and 2G/3G in idle and inactive modes and seamless mobility when the UE is in an active/connected mode. The reason to avoid UE to network signalling is that this reduces signalling load on the core network; reduces terminal battery consumption; reduces radio load; and, improves the chance of successful paging.

In the 3G connected mode there is one UMTS RNC (Radio Network Controller) that is acting as SRNC (Serving RNC), and an RRC (Radio Resource Control) connection is established between the UE (User Equipment) and this SRNC. In the idle and inactive modes a UE implements cell selection and reselection procedures, the mobile is registered on the network and is listening for paging messages, and the mobile performs location area updates when necessary.

Figure 2:
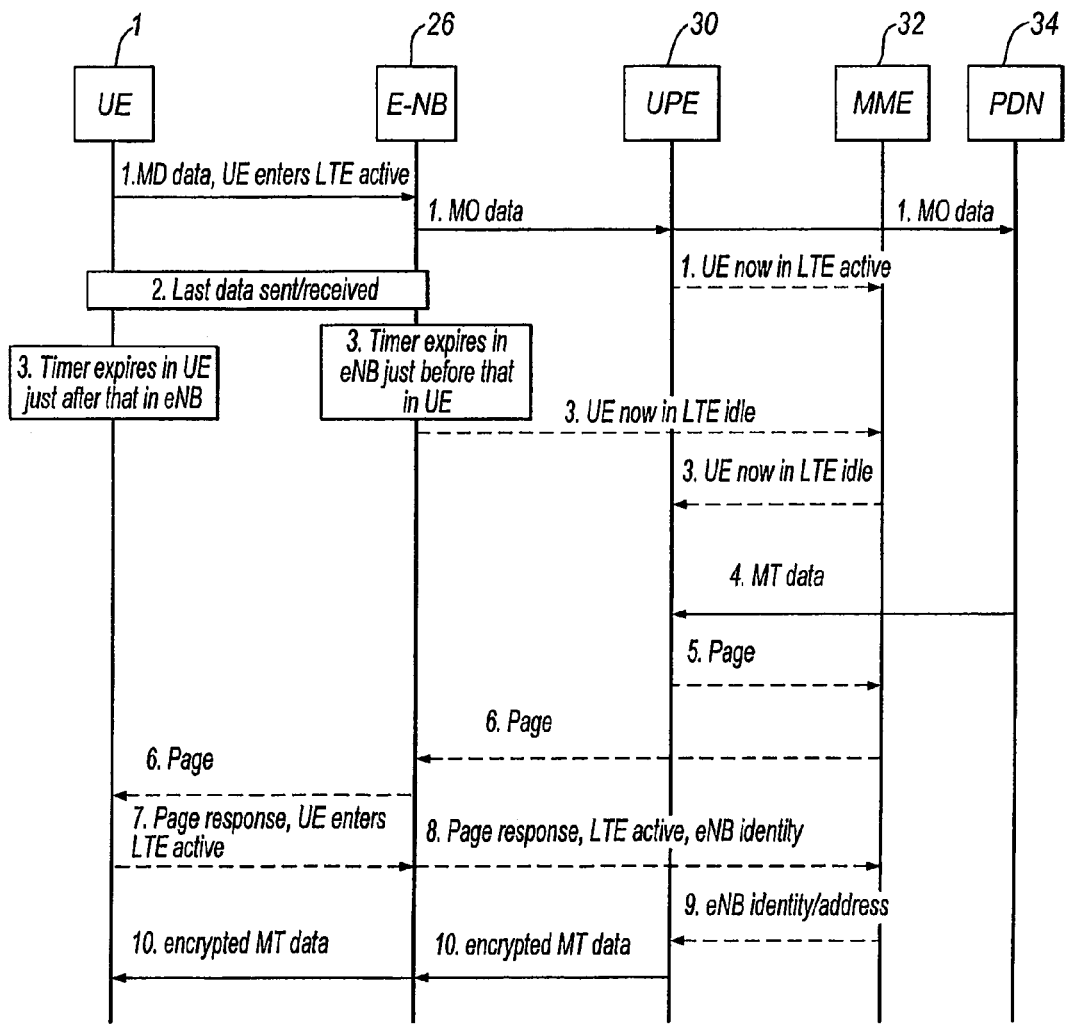
FIG. 2 shows the messaging sequence of a first embodiment of the invention, where LTE paging is initiated at the User Plane Entity (UPE)

With reference to FIG. 2 the message sequence that occurs for LTE paging at the UPE 30 will now be described, in accordance with a first embodiment of the invention.

In step 1 the UE 1 sends uplink (Mobile Originating, MO) data, or signalling such as an attach request, and enters the LTE active state. This uplink data is received by the eNodeB 26 and from there is transmitted to the PDN 34 via the UPE 30. The UPE 30 signals to the MME 32 that UE 1 is now in the LTE active state.

Step 2 represents a pause in data flow between the UE 1 and eNodeB 26. After a pause in data flow of a particular duration, it is desirable for the LTE idle state to be entered.

Both the UE 1 and the eNodeB 26 include a timer. These timers begin counting when data flow between the UE 1 and the eNodeB 26 pauses. When the timer of the UE 1 reaches a predetermined value, the UE 1 enters the LTE idle mode. When the timer of the eNodeB 26 reaches a predetermined value, the eNodeB 26 records that UE 1 has entered the LTE idle mode. The period between each of the timers beginning counting and reaching their respective predetermined value is the timer duration. According to an important feature of this embodiment, the timer duration of the timer of the UE 1 and the timer of the eNodeB 26 is different. The timer duration of the eNodeB 26 is shorter than that of the timer of the UE 1. When the eNodeB 26 timer reaches its predetermined value it causes a signalling message in step 3 to be passed to the MME 32 which informs the MME 32 that the network shall regard UE 1 as being in the LTE idle mode. The MME 32 then advises the or each UPE 30 that the UE 1 is in the LTE idle mode.

When the UE 1 is in the LTE idle mode the UE 1 may move between different base stations (eNodeBs and/or 3G Node Bs and/or 2G BTSs) without signalling this movement to the core network 28 or to SGSNs 16, 18.

As mentioned above, according to an important feature of this embodiment, the timing period of the timer of the eNodeB 26 is shorter than the timing period of the UE 1. This is advantageous because the expiration of the timing period of the timer of the eNodeB 26 causes the MME 32 and UPEs 30 to be advised that the UE 1 is in the LTE idle state. When the UPEs 30 are advised that the UE 1 is in the LTE idle state, the UPEs 30 will not attempt to send Mobile Terminating (MT) data to the UE 1. If the timer of the eNodeB 26 did not have a shorter timer period than the timer period of the timer of the UE 1, then the timer of the UE 1 may trigger the LTE idle state of the UE 1 before or simultaneously with the LTE idle state being triggered at the eNodeB 26. This could result in losing MT data if the UE 1 moves to another base station (eNodeB) when in the LTE idle state while the UPE 30 still believes that the UE 1 is in the LTE active state and attempts to transmit MT data to the UE 1 at its previous base station (eNodeB).

When subsequently downlink data from the PDN 34 is received by the UPE 30 in step 4 for transmission to the UE 1, the UPE 30 is aware that the UE 1 is in the LTE idle state as a result of the signalling from the MME 32 to the UPE 30 in message 3 above. The UPE 30 buffers the downlink data packet.

The UPE 30 then issues a request for the MME 32 to page the UE 1 in step 5.

In step 6 the MME 32 requests all eNode Bs in the tracking area to page the UE 1. (The MME 32 maintains a record of the tracking area occupied by each UE 1.) Over the next discontinuous reception (DRX) period, all the eNodeBs in the tracking area attempt to page the UE 1.

In step 7 the UE 1 responds to the eNodeB on which it is camped.

3GPP Technical Specification 23.122 has the following definition for "camped":

Camped on a cell: The MS (ME if there is no SIM) has completed the cell selection/reselection process and has chosen a cell from which it plans to receive all available services. Note that the services may be limited, and that the PLMN may not be aware of the existence of the MS (ME) within the chosen cell.

The base station (BTS, NodeB, eNodeB, etc.) on which a mobile terminal is camped is basically the cell that the mobile terminal has selected. However, because the mobile terminal is in idle mode, the network does not know on which cell the mobile is camped.

In step 8 this eNodeB forwards the page response along with the eNodeB identity and user plane address to the NE 32.

In step 9 the MME 32 forwards the user plane address to the UPEs 30.

In step 10 the UPE 30 encrypts the downlink packet (stored after receipt of the message 4 by the UPE 30) and sends this via the eNodeB 26 to the UE 1.

In this first embodiment messages 1 to 2 and 4 to 10 are in accordance with the known LTE proposal. However, the differential timing duration of the timers of the UE 1 and the eNodeB 26 is novel.

In the FIG. 2 embodiment only the LTE radio access technology is discussed. As mentioned above, it is desirable if the LTE radio access technology is deployed as part of a telecommunications system also comprising GSM and UMTS radio access technology, such that a UE 1 can switch between using these different radio access technologies. Advantageously, when the UE is in the inactive mode (in either LTE radio access technology or GSM/UMTS radio access technology), movement between base stations of the radio access technologies can occur without requiring signalling to the core networks.

In a second embodiment of the invention, now to be described with reference to FIG. 3, the arrangement allows effective paging of a mobile terminal that moves from the GSM/UMTS radio access technology to the LTE radio access technology when in the idle state or the inactive state.

As is known, if, when last in an active state, the UE 1 was in the GSM/UMTS radio access technology, and the UE 1 subsequently enters the idle state, the telecommunications system will automatically directly tunnel Mobile Terminating (MT) user plane data packets to the GSM/UMTS SGSN 16. Additionally, if the SGSN 16 is a 3G SGSN and that SGSN believes that the UE 1 is still "PMM connected", then the MT data packet will be forwarded directly to the RNC 13. The data is transmitted from the UPE 30 to the SGSN 16/RNC 13 via a GTP tunnel.

Figure 3:
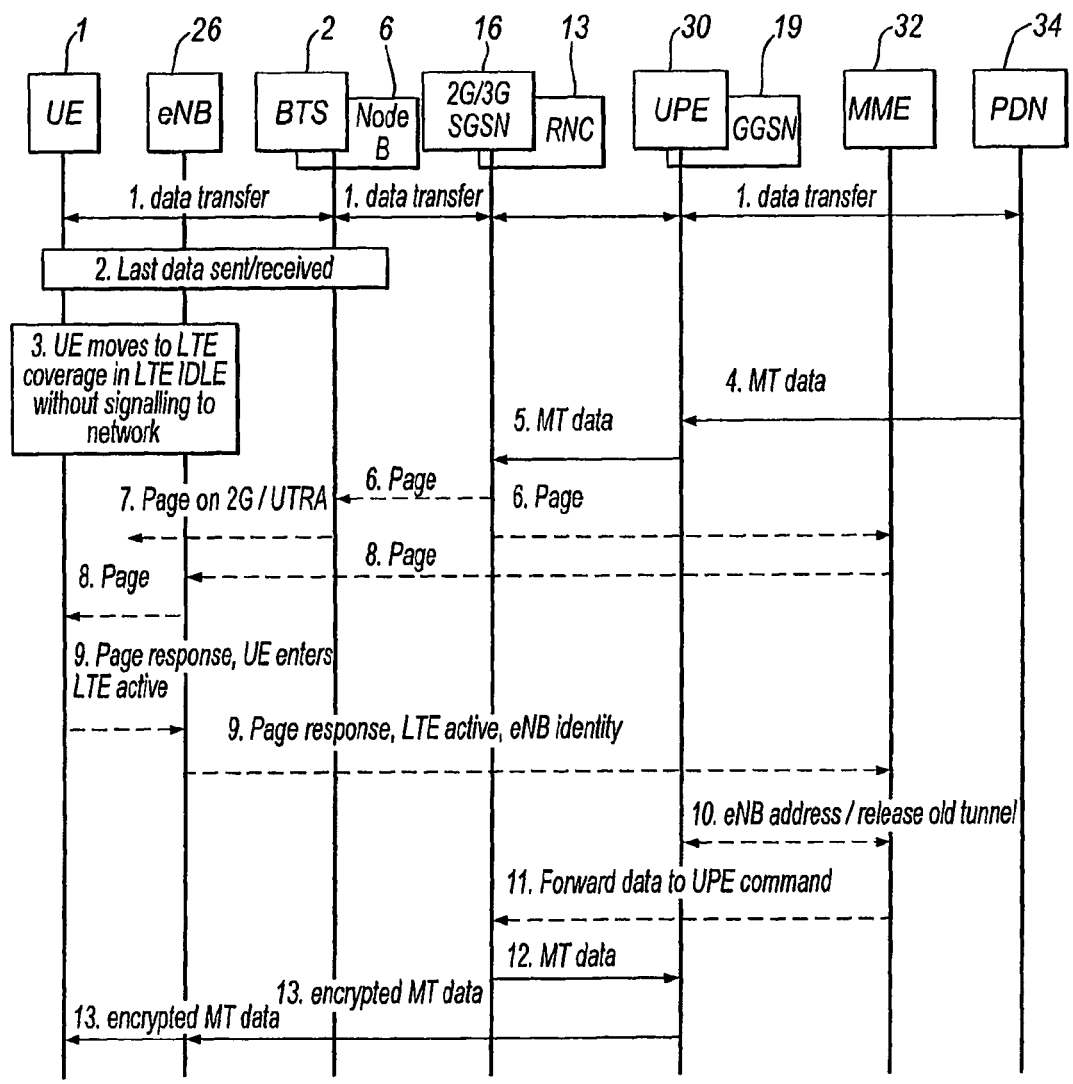
FIG. 3 shows the messaging sequence of a second embodiment, which enables effective paging of a terminal that moves from 2G/3G coverage to LTE coverage when in the idle and/or inactive state.

Referring now to FIG. 3, step 1 shows the UE 1 sending uplink data to the 2G BTS 2/3G Node B6, then onto the SGSN 16, and onwardly to the combined GGSN 19/UPE 30, and finally to the PDN 34, using the GSM/UMTS radio access technology. Step 2 indicates a pause in the transmission of data between the UE 1 and the BTS 2/Node B 6. The UE 1 then moves into an idle state or inactive state, such as GPRS-standby, PMM-idle or PMM-connected-URA-PCH.

At step 3 the UE 1 moves from GSM/UMTS coverage into LTE coverage from eNodeB 26. Prior to step 1, the UE 1 has registered in a Tracking Area of eNodeB 26 with MME 32, hence, the UE 1 does not signal to the network.

At step 4 MT data from the PDN 34 arrives at the combined GGSN 19/UPE 30. The GGSN 19 has a GTP tunnel for the UE 1 that is connected to the SGSN 16 or RNC 13. At step 5 the GGSN 19 therefore forwards the data packet to the SGSN 16/RNC 13. The SGSN 16/RNC 13 is aware that the UE 1 is in the idle state or inactive state due to the absence of user plane data transfer following step 1. At step 6, on receiving the data packet from the GGSN 19, the SGSN 16/RNC 13 sends a page to the BTS 2/nodeB 6. According to an important feature of this embodiment, the SGSN 26/RNC 13 sends a page to the MME 32 of the core network 28. Typically this page to MME 32 is sent at the same time as the page is sent to BTS 2/nodeB 6. It should be noted that, conventionally, radio access network components and SGSNs do not transmit pages to the core network.

At step 7 the UE 1 is paged by the BTS 2/nodeB 6. However, because the UE 1 is camped on eNodeB 26 of the LTE radio access technology, UE 1 does not receive this/these page(s).

At step 8 the MME 32 sends the received page (from step 6) to all the eNodeBs 26 in the tracking area in which the UE 1 is registered (this registration happened before step 1). The eNodeBs then page the UE 1.

At step 9 the UE 1 responds to the eNodeB 26 on which it is camped. This eNodeB 26 sends this response to the MME 32.

At step 10 the MME 32 informs the UPE 30 of the address of the eNodeB 26 and instructs the GGSN 19/UPE 30 to terminate downlink data transfer on the GTP tunnel to the SGSN 16/RNC 13 and now route downlink data to the eNodeB 26.

At step 11, when the MME 32 has received an acknowledgement from the GGSN 19 that the downlink has been terminated (step 10), the MME 32 instructs the SGSN 16/RNC 13 to forward all the unacknowledged MT data packets to the UPE 30.

At step 12 the SGSN 16/RNC 13, returns the MT data packets to the UPE 30. The UPE 30 then performs header compression, encryption etc. in accordance with the requirements of the LTE radio access technology.

At step 13 the MT data is then sent by the UPE 30 to the UE 1 via the eNodeB 26.

Figure 4:
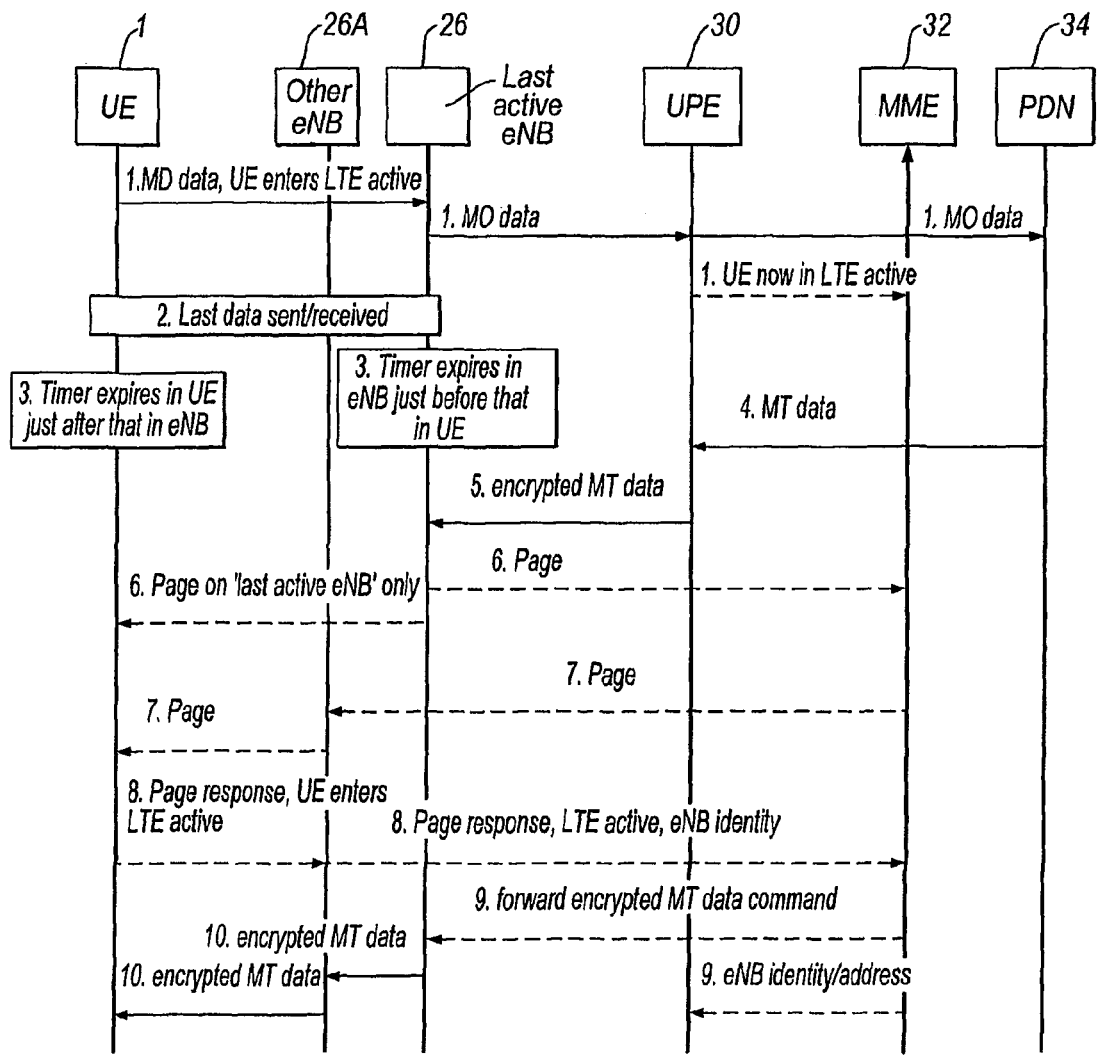
FIG. 4 shows the messaging sequence of a third embodiment, where LTE paging is initiated at the eNode B.

The third embodiment of the invention will now be described with reference to FIG. 4. FIG. 4 shows the messaging sequence for the UE 1 when in the LTE radio access technology, where paging is initiated at the eNodeB 26 (in contrast to the first embodiment described in relation to FIG. 2 where the paging initiation was by the UPE 30).

At step 1 the UE 1 sends uplink, Mobile Originating (MO), data or signalling data (such as an attach message) and enters the LTE active state. The MME 32 may be advised that the UE 1 is LTE active by signalling from the eNodeB 26, or by signalling (as shown in FIG. 4) from the UPE 30.

At step 2 data transmission between the UE 1 and the eNodeB 26 pauses.

As in the first embodiment, both the UE 1 and the eNodeB 26 include a timer. These timers begin counting when data flow between the UE 1 and the eNodeB 26 pauses. When the timer of the UE 1 reaches a predetermined value, the UE 1 enters the LTE idle mode. When the timer of the eNodeB 26 reaches a predetermined value, the eNodeB 26 records that UE 1 has entered the LTE idle mode. The period between each of the timers beginning counting and reaching their respective predetermined value is the timer duration. According to an important but non-essential feature of this embodiment, the timer duration of the timer of the UE 1 and the timer of the eNodeB 26 is different. The timer duration of the eNodeB 26 is shorter than that of the timer of the UE 1. The eNodeB 26 does not inform either the MME 32 or the UPE 30 that UE 1 is in LTE idle mode. Instead, the eNodeB 26 stores the address of the MME 32. (There is more than one MME. Generally, the eNodeB 24 will know the address of the MME 32. However, in the message flow of FIG. 4, the enodeB would/can delete the MME address and all other UE context information when the UE enters idle mode.)

At step 4 downlink data from the PDN 24 arrives at the UPE 30. At step 5 the UPE 30 performs user plane actions such as header compression encryption etc. as required by the LTE radio access technology and forwards the received data packet or packets to the last used eNodeB 26. eNodeB 26 is aware from step 3 that the UE 1 for which the data packet or packets are addressed is in the LTE idle state. The eNodeB 26 therefore buffers the downlink packet or packets and requests the MME 32 to page the UE 1 in step 6. This is an important feature of the embodiment. Conventionally, elements of the radio access network do not page elements of the core network. Additionally, the eNodeB 26 also locally pages the UE 1. This local page from the eNodeB 26 probably has a 35% or so chance of successfully contacting the UE 1 as, frequently, the UE 1 will still be located within the coverage area of the eNode B 26 with which the UE 1 was last LTE active. This local paging is faster than the UPE initiated paging because interrogation of the MME 32 is not needed.

At step 7 the MME 32 requests all eNodeBs 26, 26A, . . . in the tracking area in which the UE 1 was last known to be present to page the UE 1. Over the next DRX period, all eNodeBs page the UE 1.

At step 8 the UE 1 responds to the eNodeB 26A on which it is camped. The eNodeB 26A forwards the page response along with the eNodeB identity/user plane address to the MME 32. If the UE 1 is still registered with/camped on the previous eNodeB 26, the UE 1 will access the eNodeB 26 with an identity that is likely to allow the eNodeB 26 to immediately deliver the downlink data to the UE 1.

Assuming that the local paging of the UE 1 by the eNodeB 26 is unsuccessful, in step 9, the MME 32 requests the old eNodeB 26 to forward the data buffered by the old eNodeB 26 to the eNodeB 26A on which it is known that the UE 1 is now in LTE active. The MME 32 forwards the user plane address allocated by eNodeB 26A to the UPE 30.

At step 10 the old eNodeB 26 forwards the encrypted user data packet (stored at step 6) to the new eNodeB 26A, and the new eNodeB 26A in turn sends the data packet to the UE 1.

Figure 5:
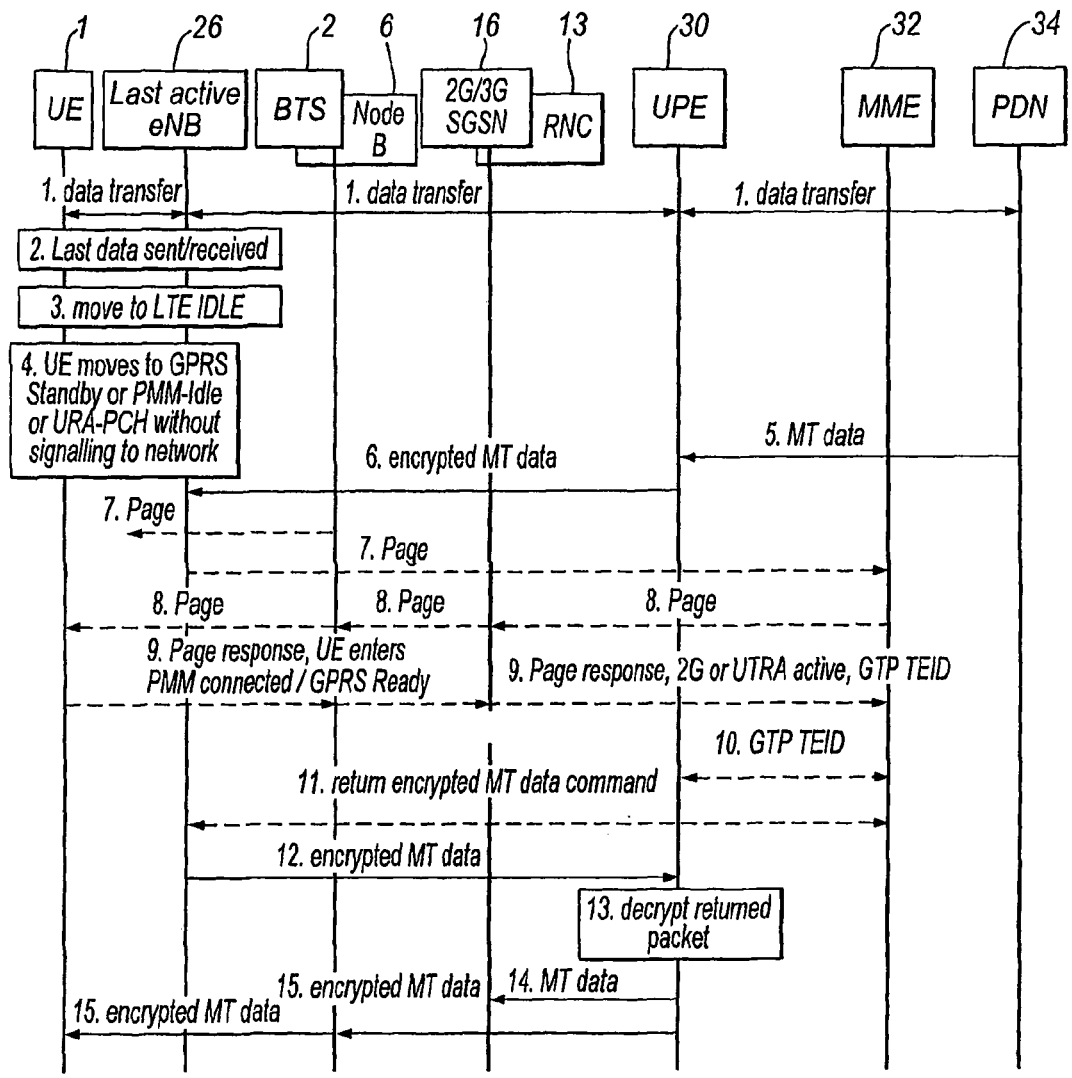
FIG. 5 shows the messaging sequence of a fourth embodiment, which enables effective paging of a terminal that moves from LTE coverage to 2G/3G coverage when in the idle and/or inactive state.

A fourth embodiment of the invention will now be described with reference to FIG. 5. In the fourth embodiment LTE paging is initiated at the eNodeB when the UE 1 was last active in LTE but the UE 1 has since moved when in the LTE idle state to the GSM/UMTS radio access technology.

Before step 1, the UE 1 has successfully performed a Tracking Area update with MME 32, and, has successfully performed a Routing Area Update with 2G/3G SGSN 16.

At step 1 data is transferred from the UE 1 to the eNodeB 26, and from there to the combined UPE 30/GGSN 19, and thence to the PDN 24 in the normal manner for LTE radio access technology.

At step 2 there is a pause in data being transmitted between the UE 1 and the eNodeB 26.

At step 3 the pause is sufficient for the UE 1 to enter the LTE idle state.

At step 4 the UE 1 when in the LTE idle state moves from coverage of the eNodeB 26 into coverage of BTS 2/NodeB 6. The movement between LTE and GSM/UMTS coverage by the UE is not signalled to the core network. The movement of the UE 1 into GSM/UMTS coverage is in a 2G/3G routing area where the UE 1 is already "updated" within the SGSN 16.

At step 5 MT data is received by the UPE 30/GGSN 19 from the PDN 24 that is addressed to the UE 1.

At step 6 the UPE 30 performs user plane tasks, such as header compression, encryption etc. required by LTE, and forwards the encrypted data packet or packets to the last active eNodeB 26.

At step 7 the eNodeB 26 buffers the downlink packet received from the UPE 30. The eNodeB 26 attempts to locally page the UE 1. This local page will be unsuccessful because the UE 1 is now in GSM/UMTS coverage. The eNodeB 26 also requests the MME 32 to page the UE 1. This is an important feature of this embodiment. Conventionally, an element of the radio access network does not page the core network. Typically this request is sent to MME 32 before the local page is sent by eNodeB 26 on the radio interface.

At step 8 the MME 32, in response to the page instruction received from the MME 32, pages the SGSN 16 with a new signalling message. If the SGSN 16 is a UMTS SGSN and knows that the UE 1 is PMM connected (e.g. if the UE 1 is in URA_PCH), then the SGSN 16 pages the RNC 13 (with a new message). Also, the MME 32 requests all the eNodeBs serving the tracking area in which UE 1 is registered to page the UE 1 (this step is not shown in FIG. 5). The SGSN 16/RNC 13 transmits the page to the UE 1 via the relevant BTS 2/NodeB 6.

At step 9 the UE 1 responds to the BTS 2/NodeB 6 on which it is camped. This page response is transmitted to the SGSN 16, which return the page response along with the user plane's GTP TEID to the MME 32.

At step 10 the MME 32 informs the UPE 30 of the GTP TEID and instructs the UPE 30 that the UE 1 is now available on GSM/UMTS radio access technology.

At step 11 the MME 32 receives acknowledgement of completion of step 10 from the UPE 30. The MME 32 then instructs the last active eNodeB 26 to return the MT data packet or packets to the UPE 30, these data packets being buffered in step 7 above.

At step 12 the encrypted data packets are returned by the eNodeB 26 to the UPE 30.

According to an important but non-essential feature of this embodiment, at step 13 the UPE 30 decrypts the received packet or packets so that they can be successfully received and interpreted in GSM/UMTS.

At step 14 the decrypted packet or packets are transmitted by the UPE 30 to the SGSN 16/RNC 13.

At step 15 the packet or packets are transmitted to the UE 1 via the BTS 2/NodeB 6.

In the first embodiment described in relation to FIG. 2, errors can occur if the MT data in step 4 arrives at the UPE 30 after the eNodeB 26 has transmitted the message in step 3 to the MME indicating that the UE 1 has gone to the LTE idle state but before this message is received by the MME 32 and UPE 30. The MT data arriving at step 4 in this manner may be tunneled to the eNodeB 26 but could not be delivered to the UE 1 as it is in the LTE idle state.

This potential problem may be minimised by modifying the eNodeB 26 to send the message in step 3 to the MME 32 and then continuing to act as if it was in the LTE active state for a time period after sending the message to the MME 32 in step 3. For example, this time period could be between 2 and 6 seconds.

In the second embodiment described in relation to FIG. 3, a message crossing or race condition is avoided if the message sent by the MME 32 in step 10 is acknowledged by the UPE 30 before the message transmitted between the MME 32 and the SGSN 16/RNC 13 is sent in step 11.

In the third embodiment described in relation to FIG. 4, the steps performed when a UE becomes idle are described. Some UEs will be inactive for large periods of time. During this time, there may be many reasons why the UE's context is lost or deleted in the eNodeB. For these UEs, it is advantageous to be able to deliver mobile terminating (MT) data. However, for these UEs, some extra delay and/or processing may be acceptable.

One solution is that when MT data arrives at an eNodeB 26 (in a similar manner to step 5 of FIG. 4), and the eNodeB 26 has lost the MME address for that context, the eNodeB 26 interrogates the UPE 30 to obtain the MME address (of MME 32). The UPE 30 returns the MME address (of MME 32) to the eNodeB 26 and the procedure shown from step 6 of FIG. 4 is then followed.

An equivalent of Periodic RA Updating for the tracking area ensures that the MME-eNodeB-UE relationship does not get too out of date.

Another issue is that of an eNodeB being removed from the network and/or when an eNode B goes "out of service". In both these cases, the UPE 30 sends the MT user data packets towards the eNodeB 26 and these packets will not be delivered. Advantageously an (ICMP) management packet (Internet Control Message Protocol) is returned to the UPE 30 and the UPE 30 can then send a page to the MME 32 and the MME 32 then pages UE 1 within the Tracking Areas and routing Areas in which UE 1 is registered.

Another mechanism which could be employed is the Echo Request/Echo Response mechanism as described in TS 29.060. However, this may result in a large quantity of messages if every UPE frequently pings every eNodeB.

The invention claimed is:

1. A telecommunications network system, comprising:
a first radio access technology including a first radio access network and a first network core;
a second radio access technology including a second radio access network and a second network core, wherein the first network core and the second network core are operable to page a mobile terminal, wherein at least one element of the telecommunications network system is operable to receive mobile terminating data from the radio access networks and to determine whether the mobile terminating data can be delivered to the mobile terminal, wherein said at least one element is operable to instruct at least one of the network cores to page the mobile terminal if the mobile terminating data cannot be delivered to the mobile terminal, wherein the at least one element receives the mobile terminating data from a particular one of the radio access technologies, determines whether said mobile terminal is camped with the particular one of the radio access technologies and notifies the at least one of the network cores if the mobile terminal is not camped with the particular one of the radio access technologies, wherein the mobile terminal has an active state in which a cell occupied by the mobile terminal is known and an idle or inactive state when the cell occupied by the mobile terminal is not known but in which a last area known to be occupied by the mobile terminal is recorded, and wherein the state of the mobile terminal determines signaling performance when the mobile terminal moves from one of the radio access technologies to the other of the radio access technologies.

2. The network system of claim 1, wherein said at least one element is part of at least one of the radio access networks.

3. The network system of claim 1, wherein said at least one element includes at least one of: an SGSN, an RNC, a base transceiver station and eNodeB.

4. The network system of claim 1, wherein the at least one element includes a first element of the first radio access technology and a second element of the second radio access technology.

5. The network system of claim 1, wherein said first network core and said second network core include at least one common element.

6. The network system of claim 5, wherein said common element comprises a mobility management element.

7. The network system of claim 1, wherein the first radio access network is divided into a plurality of first areas and the second radio access network is divided into a plurality of second areas, and wherein the first areas are different from the second areas.

8. The network system of claim 7, wherein the first radio access network is divided into a plurality of first cells, each served by a respective base station, and said second radio access network is divided into a plurality of second cells, each served by a respective base station, said first cells being smaller than said first areas and said second cells being smaller than said second areas.

9. The network system of claim 8, wherein said base stations each comprise at least one of: a base transceiver station, Node B and eNodeB.

10. The network system of claim 1, wherein when the mobile terminal is in the idle or inactive state no signaling from the mobile terminal to the core network is performed when the mobile terminal moves from one of the radio access technologies to the other of the radio access technologies.

11. A method of operating a telecommunications network system having a first radio access technology including a first radio access network and a first network core and a having a second radio access technology including a second radio access network and a second network core, the first network core and the second network core being operable to page a mobile terminal, the method comprising:
receiving at least one element of the telecommunications network mobile terminating data from at least one of the radio access networks;
determining whether the mobile terminating data can be delivered to the mobile terminal; and
instructing at least one of the network cores, via said at least one element, to page the mobile terminal if the mobile terminating data cannot be delivered to the mobile terminal, wherein the at least one element receives the mobile terminating data from a particular one of the radio access technologies, determines whether said mobile terminal is camped with the particular one of the radio access technologies and notifies the at least one of the network cores if the mobile terminal is not camped with the particular one of the radio access technologies, wherein the state of the mobile terminal determines signaling performance when the mobile terminal moves from one of the radio access technologies to the other of the radio access technologies.

12. The method of claim 11, wherein said at least one element is part of at least one of the radio access networks.

13. The method of claim 11, wherein said at least one element includes at least one of: an SGSN, an RNC, a base transceiver station and eNodeB.

14. The method of claim 11, wherein the at least one element includes a first element of the first radio access technology and a second element of the second radio access technology.

15. The method of claim 11, wherein the first radio access network is divided into a plurality of first areas and the second radio access network is divided into a plurality of second areas, and wherein the first areas are different from the second areas.

16. The method of claim 15, wherein the first radio access network is divided into a plurality of first cells, each served by a respective base station, and said second radio access network is divided into a plurality of second cells, each served by a respective base station, said first cells being smaller than said first areas and said second cells being smaller than said second areas.

17. The method of claim 16, wherein said base stations each comprise at least one of: a base transceiver station, Node B and eNodeB.

18. The method of claim 11, wherein when the mobile terminal is in the idle or inactive state no signaling from the mobile terminal to the core network is performed when the mobile terminal moves from one of the radio access technologies to the other of the radio access technologies.

* * * * *